No. 732,303. PATENTED JUNE 30, 1903.
C. C. KELLEY.
SPRING WHEEL.
APPLICATION FILED FEB. 17, 1903.
NO MODEL. 2 SHEETS—SHEET 1.
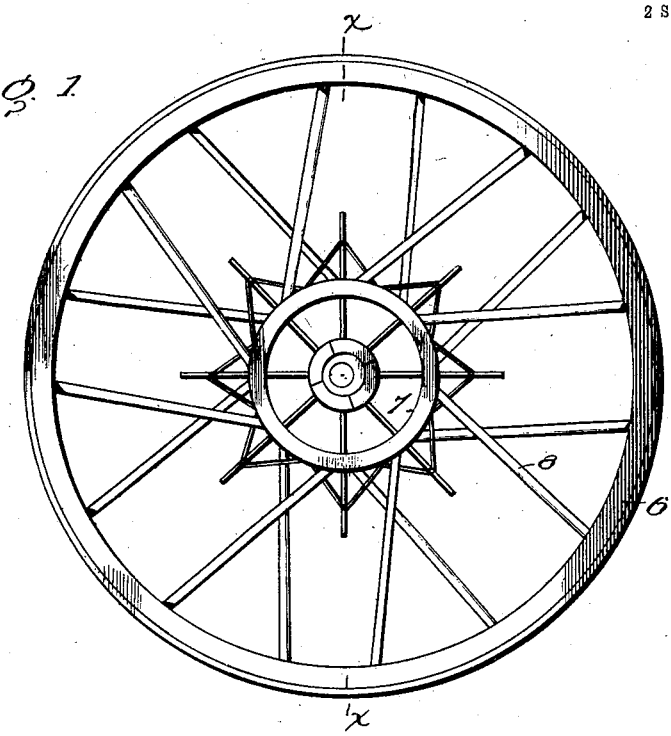
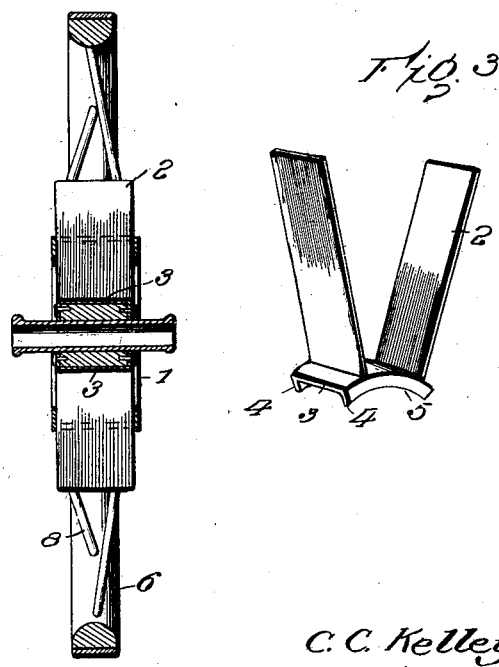
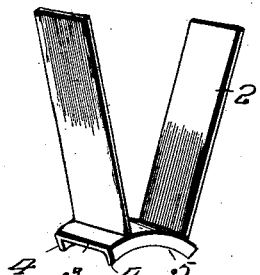
Witnesses
Inventor
C. C. Kelley
By
Attorneys No. 732,303. PATENTED JUNE 30, 1903.
C. C. KELLEY.
SPRING WHEEL.
APPLICATION FILED FEB. 17, 1903.
NO MODEL. 2 SHEETS—SHEET 2.
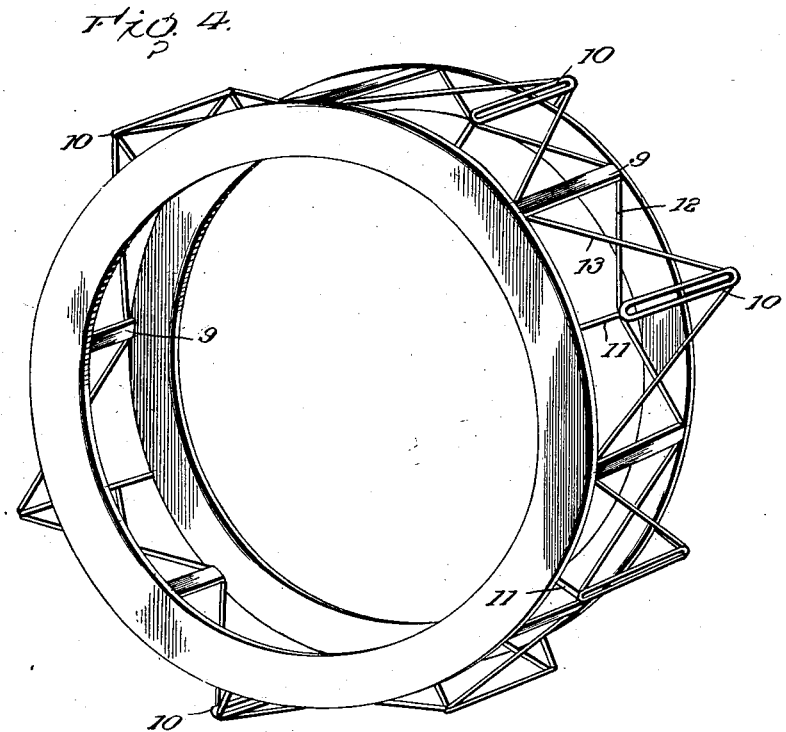
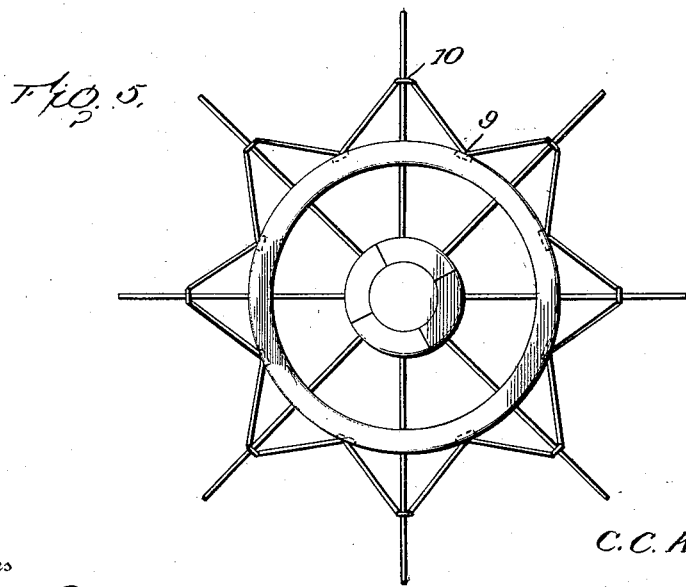

No. 732,303. Patented June 30, 1903.

UNITED STATES PATENT OFFICE.

CHARLES CLAUDIUS KELLEY, OF SALEM, WEST VIRGINIA, ASSIGNOR OF ONE-THIRD TO CHARLES A. F. RANDOLPH AND LUCIAN D. LOWTHER, OF SALEM, WEST VIRGINIA.

SPRING-WHEEL.

SPECIFICATION forming part of Letters Patent No. 732,303, dated June 30, 1903.

Application filed February 17, 1903. Serial No. 143,846. (No model.)

*To all whom it may concern:*

Be it known that I, CHARLES CLAUDIUS KELLEY, a citizen of the United States, residing at Salem, in the county of Harrison and State of West Virginia, have invented certain new and useful Improvements in Spring-Wheels, of which the following is a specification.

This invention has for its object to devise a wheel involving novel features and of the type adapted to compensate for jar and vibration and prevent transmission thereof to the rider and which will enable the use of a metal tire, thereby obviating the objectionable features urged against pneumatic and other soft-tread tires.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a side elevation of a wheel embodying the invention. Fig. 2 is a vertical section about on the line X X of Fig. 1. Fig. 3 is a detail perspective view of some of the spring-guides, showing the means for attaching them to the hub. Fig. 4 is a perspective view of the inner-rim portion of the wheel-body, showing the guides and braces coöperating therewith and connecting the coördinate parts. Fig. 5 is a side elevation of the hub and inner-rim portion of the wheel, the outer rim and spokes being omitted.

Corresponding and like parts are referred to in the following description and indicated in all the views of the drawings by the same reference characters.

The wheel comprises, essentially, two parts—the hub portion and the outer or body portion—the same being yieldably connected to admit of relative play, whereby vibration, jar, and jolt are neutralized.

The hub 1 is provided with end extensions to enable the wheel to obtain substantial bearing upon the axle-arm. Spring-guides 2 are rigidly connected at their inner ends to the hub and are comparatively thin and wide, the object being to resist lateral strain and admit of yielding movement in the plane of the wheel. In the preferable construction the spring-guides 2 are arranged in groups and form a part of or are applied at their inner ends to sections 3 of a ring encircling the hub 1 and attached thereto. Each section of the ring is formed with side flanges 4, which embrace the sides of the hub and are provided with clamp-screws 5 for securance of the sections thereto. This construction admits of the spring-guides being readily detached from and applied to the hub as may be required.

The body portion of the wheel comprises the outer rim 6, inner rim 7, and spokes 8, connecting the rims 6 and 7 and of any structural type. The inner rim comprises companion members spaced apart and connected by tie-bars 9. Guides 10 are connected at their ends to the companion members of the inner rim by struts 11 or equivalent means and are adapted to coöperate with the flat springs 2 for sustaining the weight or load imposed upon the wheel. Braces 12 and 13 connect opposite ends of adjacent guides 10 with the companion members of the inner rim, said braces being oppositely deflected intermediate of their ends and firmly attached at said points to the respective members of the rim 7. The braces 12 and 13 are deflected outward and downward, as indicated most clearly in Figs. 4 and 5, thereby admitting of a limited play of the guides 10 toward and from one another as the parts of the wheel relatively move to compensate for and neutralize vibration and other shock. While the braces 12 and 13 admit of limited play of the parts of the wheel in the plane thereof, they brace the wheel against lateral strain and stress, as will be readily comprehended.

When the parts are assembled substantially as shown in Fig. 1, and the wheel is loaded, the perpendicular strain exerts a maximum force upon the horizontal spring-guides and tends to move the same upward at their outer ends and downward at their inner ends. This strain is uniformly distributed upon the series of spring-guides 2 and coöperating guides 10 by reason of the brace connections 12 and 13, and since the parts are sufficiently stout to withstand the strain and load a limited yielding movement only is the result. Obviously the relative movement between the hub and body portions of the wheel is proportionate to the shock met with, so as to neutralize the same. By having the guides 10 arranged farther from the center of the wheel than the inner rim 7 the structure is more firmly braced and the wheel better adapted to overcome jolt and prevent transference thereof to the vehicle.

Having thus described the invention, what is claimed as new is—

1. In combination, a wheel comprising hub and body portions, spring-guides projected outward from the hub, other guides coöperating with the spring-guides, and braces connecting the outer guides with the inner portion of the wheel-body, substantially as set forth.

2. In a wheel, the combination with the hub and body portions, spring-guides extended outward from the hub, coöperating guides applied to the inner portion of the wheel-body, and complementary braces connecting the guides with the wheel-body and oppositely deflected between adjacent guides laterally and radially, substantially as specified.

3. In a wheel, and in combination with the hub and body portions, the latter comprising an inner rim composed of companion members spaced apart, spring-guides extended outward from the hub and coming between the companion members of said inner rim, a second set of guides coöperating with the spring-guides, and oppositely-deflected braces connecting the said second set of guides with the companion members of the inner rim, substantially as set forth.

4. In a wheel, the combination with the body and hub portions, a sectional ring flanged at its sides to embrace the hub and secured thereto, spring-guides extended outward from the sectional ring, a second set of guides coöperating with the spring-guides, and oppositely-deflected braces connecting the said second set of guides with the body portion of the wheel, substantially as set forth.

5. A wheel comprising hub and body portions, the latter comprising inner and outer rims and spokes connecting the same, the inner rim being composed of companion members spaced apart and connected by transverse bars, spring-guides extended outward from the hub, a second set of guides coöperating with the spring-guides, and braces connected at their ends to corresponding ends of adjacent guides of the second set and oppositely deflected laterally and radially and connected intermediate of their ends to the respective members of the inner rim, substantially as specified.

In testimony whereof I affix my signature in presence of two witnesses.

CHARLES CLAUDIUS KELLEY. [L. S.]

Witnesses:
LUCIAN D. LOWTHER,
CHARLES F. RANDOLPH.